United States Patent [19]

Sano et al.

[11] 4,272,378
[45] * Jun. 9, 1981

[54] SEMIPERMEABLE MEMBRANE

[75] Inventors: Takezo Sano, Takatsuki; Takatoshi Shimomura, Toyonaka; Masao Sasaki, Osaka; Ichiki Murase, Ibaragi, all of Japan

[73] Assignee: Sumitomo Chemical Company, Limited, Osaka, Japan

[*] Notice: The portion of the term of this patent subsequent to Aug. 15, 1995, has been disclaimed.

[21] Appl. No.: 701

[22] Filed: Jan. 3, 1979

Related U.S. Application Data

[62] Division of Ser. No. 714,239, Aug. 13, 1976, Pat. No. 4,147,745.

[30] Foreign Application Priority Data

Aug. 25, 1975 [JP] Japan ................ 50/103329

[51] Int. Cl.³ ............................................ B01D 39/00
[52] U.S. Cl. ................... 210/500.2; 210/654
[58] Field of Search ............. 210/500 M, 25, 22, 490; 264/22, 41; 521/27

[56] References Cited

U.S. PATENT DOCUMENTS

| 3,615,024 | 10/1971 | Michaels | 210/490 |
| 3,933,653 | 1/1976 | Hashino et al. | 210/500 M |
| 3,950,257 | 4/1976 | Ishii et al. | 210/500 M |
| 3,992,495 | 11/1976 | Sano et al. | 264/22 |
| 4,046,843 | 9/1977 | Sano et al. | 210/500 M |
| 4,107,049 | 8/1978 | Sano et al. | 264/22 |
| 4,147,745 | 4/1979 | Sano et al. | 210/500 M |

FOREIGN PATENT DOCUMENTS 2414795  3/1974  Fed. Rep. of Germany.
2442209  3/1975  Fed. Rep. of Germany.

Primary Examiner—Charles N. Hart
Assistant Examiner—E. Rollins Cross
Attorney, Agent, or Firm—Stevens, Davis, Miller & Mosher

[57] ABSTRACT

A method for the preparation of a semipermeable membrane which comprises exposing porous shaped articles of polyacrylonitrile or copolymers thereof containing acrylonitrile in an amount of more than 40% by mole to a plasma.

The resulting semipermeable membrane is very useful for separating substances by reverse osmosis or ultrafiltration.

3 Claims, 1 Drawing Figure

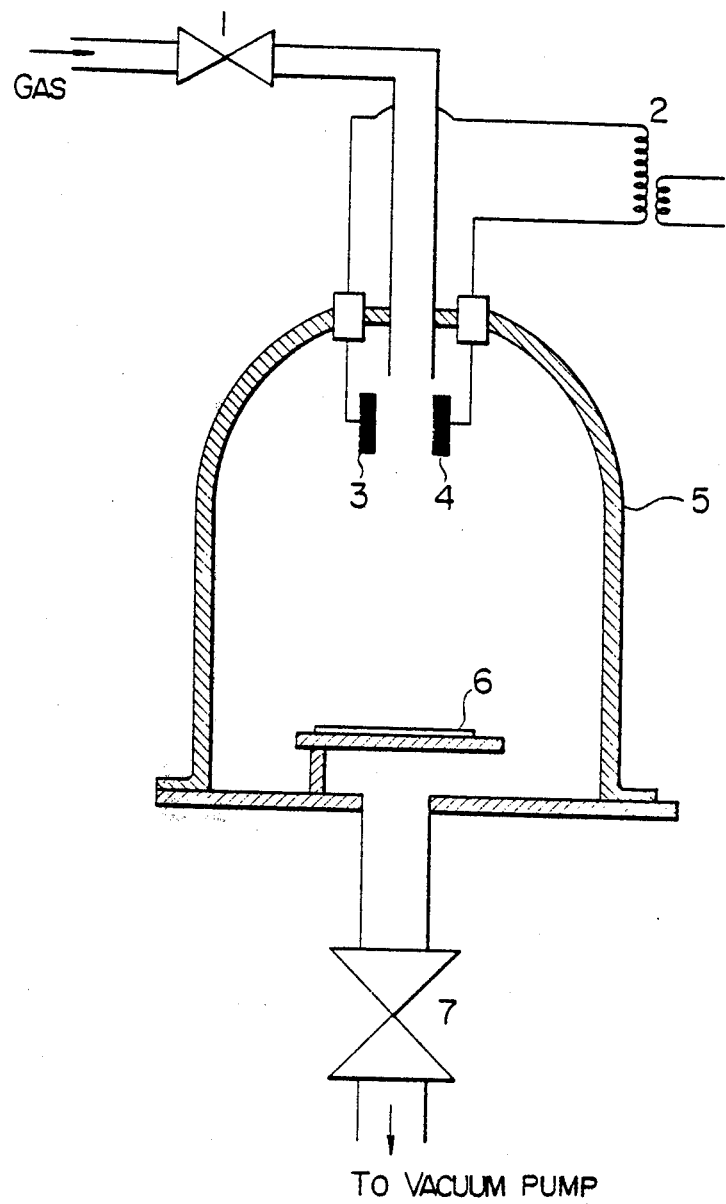

SEMIPERMEABLE MEMBRANE

This is a division of application Ser. No. 714,239 filed Aug. 13, 1976, now U.S. Pat. No. 4,147,745.

The present invention relates to a method for the preparation of a semipermeable membrane for reverse osmosis or ultrafiltration by exposing a porous membrane of polyacrylonitrile type polymers to a plasma thereby crosslinking the surface thereof.

The semipermeable membrane now in industrial production is a cellulose acetate membrane produced according to the method of Loeb and Sourirajan (U.S. Pat. Nos. 3,133,132 and 3,133,137) or a similar method. Although this membrane is very highly permeable to water but not to sodium chloride, it deteriorates in performance owing to the inherent susceptibility of cellulose acetate to hydrolysis. As the results, the ability to remove solutes including sodium chloride becomes poor with the lapse of time and the life of the membrane is limited.

Further, Loeb's method for the preparation of an asymmetric membrane having a skin structure requires a high-level technique and severe operation conditions. Consequently, this method is only successful in a few cases of synthetic high polymers besides cellulose acetate. This is due to the fact that it is difficult to properly select the casting solvent, additives, composition and temperature of the casting solution, atmosphere wherein evaporation of the solvent is in progress, and temperature of the atmosphere. Therefore, this method may not be said to be widely applicable.

In recent years, on the other hand, various attempts have been made to prepare a polyacrylonitrile type semipermeable membrane which is superior to cellulose acetate in chemical, mechanical and thermal properties and in water permeability [for example Japanese Patent Publication (unexamined) Nos. 6257/1972 and 43,878/1974]. These attempts are intended to form a skin layer and a supporting layer at the same time by the above described casting process; however, the resulting membrane does not have stable performance because selection of proper casting conditions is very difficult. In the case of polyacrylonitrile type polymers, it is said that formation of the skin layer is difficult by the casting process.

In order to overcome the disadvantages of the aforesaid methods for preparing a semipermeable membrane, the inventors have extensively studied to prepare a semipermeable membrane by exposing various high molecular weight substances to a plasma to thereby crosslink only the surface thereof. As the results, the following important facts were surprisingly found: when a porous membrane of polyacrylonitrile type polymers is exposed to a plasma, a very thin, dense crosslinked layer, 1μ or less in thickness, is formed at the surface of the membrane; the exposed membrane has a superior ability to separate water from the solute particularly sodium chloride when used in reverse osmosis or ultrafiltration; and the ability is much superior to that of the membrane of cellulose acetate or commercially available synthetic polymers.

According to the present invention, it is possible to prepare a polyacrylonitrile type semipermeable membrane which is free from the defects of the conventional cellulose acetate membrane, namely susceptibility to hydrolysis and deterioration by the action of bacteria, and is utilizable in the separation and concentration of substances.

An object of the present invention is to provide a method for the preparation of a semipermeable membrane for reverse osmosis and ultrafiltration which comprises exposing a porous membrane of polyacrylonitrile type polymers to a plasma thereby forming a dense crosslinked layer having a selective permeability to substances at the surface of the membrane.

FIG. 1 is a schematic diagram of a plasma irradiating apparatus for use in the method of the present invention.

In the diagram, 1 and 7 are cocks, 2 a neon transformer, 3 and 4 electrodes, 5 a vessel and 6 a sample.

Polyacrylonitrile of the present invention is prepared by the well-known methods. As the monomers to be copolymerized with acrylontrile, there may be exemplified the well-known compounds copolymerizable with acrylonitrile, for example, a nonionic monomer (e.g. acrylamide, diacetone acrylamide, N-vinyl-2-pyrrolidone, hydroxylethyl methacrylate, methyl acrylate, ethyl acrylate, butyl acrylate, methyl methacrylate, ethyl methacrylate, vinyl acetate). Further, acrylonitrile is easily polymerizable with, for example an ionic monomer (e.g. acrylic acid, ethylene sulfonic acid, methacrylic acid, methallyl sulfonic acid sulfopropyl methacrylate, vinylbenzene sulfonic acid, metal salts thereof), tertiary amines (e.g. 2-vinylpyridine, 4-vinylpyridine, dimethylaminoethyl methacrylate) and quaternary amine salts resulting from alkylation of the tertiary amines. The acrylonitrile copolymers used herein are copolymers of acrylonitrile and one or more of the monomers.

The amounts of the monomers may be varied as desired, but when the acrylonitrile content of the copolymers is reduced to less than 40% by mole, the membrane formed has an extremely poor mechanical property. Consequently, particularly preferred copolymers are those containing 70 to 95% by mole of acrylonitrile. The polyacrylonitrile and acrylonitrile copolymers used herein have a molecular weight of 5,000 to 5,000,000.

The porous shaped articles to be subjected to exposure by plasma have a porosity of 10 to 90%. The porous shaped articles are not particularly limited in the method for the preparation thereof, but particularly preferred ones are porous membranes prepared by the conventional casting process comprising solvent evaporation and gelation. The porous articles may be used in various forms. Specifically, the articles may have the form of a sheet or hollow fiber in addition to membrane or may be a composite with other porous supports. The articles are used practically as a module having a suitable form after being exposed to a plasma.

The usual casting process for the preparation of a porous membrane of polyacrylonitrile type polymers is as follows. First, polyacrylonitrile or acrylonitrile copolymers are dissolved in a solvent so that the concentration thereof is 5 to 30% by weight. The solvent used is an aqueous solution containing inorganic salts or an organic polar solvent such as dimethylacetamide, dimethylformamide or dimethyl sulfoxide.

The polymer solution obtained is cast on a substrate for example a glass plate with a doctor knife. The thickness of the cast solution is related to the thickness of the semipermeable membrane. Consequently, the thickness of the solution on the substrate is generally controlled so as to form a semipermeable membrane having a thickness of about 100μ. The coated substrate is dipped in a non-solvent immediately after the casting or after the solvent of the solution is evaporated for some time.

In general, the period of time during which the solvent is evaporated is preferably 0 to 60 minutes and the evaporation is preferably carried out at a temperature between 0° C. and the boiling point of the solvent. Thereafter, the coated substrate, from which the solvent may partially be evaporated or may not be evaporated, is dipped in a non-solvent. As the non-solvent, there may be used water or a mixture of water and an organic solvent. The organic solvent used herein is a water-soluble one and preferably the same solvent that is used for the preparation of said polymer solution.

In the preparation of the porous membrane, various operation conditions, for example polymer concentration, casting temperature, evaporation time and gelation temperature, have, of course, an influence to some extent on the performance of the final product, namely the plasma-exposed membrane, but the conditions are not decisive. The porous membrane thus obtained can be subjected to exposure to plasma, if it has a water permeability of 1 to 1,000 gfd (under a pressure of 10 kg/cm$^2$) and a bubble point of more than 1 kg/cm$^2$ in the wet state of the membrane, in other words, if the membrane is free from defects. The present invention is rather intended to regulate the performance of the final product by controlling the plasma exposure conditions. In the exposure to plasma, a dried porous membrane is used in principle.

The plasma in the present invention refers to one generated by glow discharge, corona discharge or the like. For example, the plasma by glow discharge is generated by introducing a gas (e.g. hydrogen, helium, argon, nitrogen, oxygen, carbon monooxide, carbon dioxide, ammonia) into a vacuum vessel 5 as shown in FIG. 1 through a cock 1 so that the pressure in the vessel becomes 0.01 to 10 Torr, and applying an alternating current or direct current voltage of 0.5 to 50 kV between electrodes 3 and 4 by means of a neon transformer 2. Further, a plasma is produced by generating corona discharge in the atmosphere or in an inert gas with a direct current of 0.1 to 1.3 A at 1 kV. In this case, industrial production of the semipermeable membrane becomes easier.

The plasma thus generated penetrates into substances to such an extremely low extent that it is very useful for crosslinking a polyacrylonitrile type porous membrane only at the surface, thereby allowing the membrane to be impermeable to a solute.

The separation property of the semipermeable membranes of the present invention is determined by controlling various factors, among which the exposure time and exposure dose are important. By varying these two factors, it is possible to control the degree of crosslinking at the membrane surface and thereby to obtain a membrane having the desired separation property. Usually, the exposure time is 5 to 120 minutes and the exposure does is 5 to 100 watt. These exposure conditions are not general but dependent upon the water permeability and crosslinkability of the polyacrylonitrile porous membrane in the wet state.

As described above, the method of the present invention is characterized by crosslinking a polyacrylonitrile type porous membrane only in the vicinity of the surface by making use of a low degree of penetration of plasma into substances, thereby producing a very dense layer at the surface. By this novel technique, it becomes easy to produce a crosslinked, dense layer having a thickness of less than 1$\mu$. Consequently, this method is completely free from the difficulty of skin layer-formation which is encountered in the casting process.

The semipermeable membrane of the present invention has a thickness of 20 to 500$\mu$. By electron microscopic observation, it is found that the membrane has the following characteristic, heterogeneous structure: pores of 100 to 1,000 Å in size are present in the layer close to the crosslinked surface layer and the size of the pores increases gradually to 1 to 1,000$\mu$ towards the back surface of the membrane.

On the other hand, one of the features of the present semipermeable membrane is that the membrane is much superior to the conventional cellulose acetate membranes in chemical, mechanical and thermal properties and in its ability to separate substances when used in reverse osmosis and the like.

In other words, the semipermeable membrane of the present invention is sufficiently usuable in a pH range as wide as 1 to 12 and at a highest temperature of 80° C. Moreover, the membrane can remove phenol, acetic acid, urea, acetone and ethanol which are difficultly removable by means of the cellulose acetate membranes. In this case, those substances are removed with a high rejection of 60 to 90%.

Consequently, the plasma-exposed polyacrylonitrile type semipermeable membrane of the present invention is widely used for separating or concentrating substances by reverse osmosis, ultrafiltration or the like. More specifically, it is used for the preparation of fresh water from sea water, waste water treatment, concentration of fruit juices and the like. Further, the present semipermeable membrane is insoluble in many organic solvents so that it is widely applicable to separation of nonaqueous fluids.

The present invention will be illustrated more specifically with reference to the following examples, which are not however intended to limit the invention thereto.

The solute rejection is defined by the following equation:

$$\text{Solute rejection (\%)} = \left(1 - \frac{\text{the concentration of solute in permeated solution}}{\text{the concentration of solute in feed solution}}\right) \times 100$$

EXAMPLE 1

A copolymer comprising 89% by mole of acrylonitrile and 11% by mole of ethyl acrylate was prepared by the well-known method. Twenty parts of the copolymer were dissolved in a mixed solvent of 70 parts of dimethylformamide and 10 parts of formamide. The resulting solution was cast on a glass plate kept at 40° C. so that the thickness of the solution became 250$\mu$. After 1 minute's evaporation, the glass plate was immersed in water at 16° to 17° C. to carry out gelation of the solution.

After 2 hours, the resulting membrane was removed from the glass plate and was tested, as such, for water permeability under a pressure of 10 kg/cm$^2$. As the results, the water flux was 87 gallons/feet$^2$ day (gfd).

Next, the wet membrane was dried overnight at room temperature. The dry membrane was placed in a vacuum vessel shown in FIG. 1 and a pressure of 0.2 Torr of helium gas was applied in the vessel by controlling cocks 1 and 7. Thereafter, an alternating current voltage of 3.0 kV was applied between electrodes 3 and 4 by means of a neon transformer 2 and the membrane was exposed to the plasma for 60 minutes under such conditions.

The exposed membrane was mounted on a continuous reverse osmosis apparatus (effective area of membrane 13 cm²) usually used in a laboratory and tested for saline water permeability (sodium chloride concentration 0.55%).

| Experimental conditions: | |
| --- | --- |
| Pressure | 50 kg/cm² |
| Temperature of saline water | 25° C. |
| Feed rate of saline water | 270 ml/min |
| Experimental results (performance of semipermeable membrane): | |
| Water flux | 10.5 gfd |
| Salt rejection | 98.3% |

The unexposed, dry membrane was likewise tested. As the results, the water flux was 6.4 gfd and it showed no ability to remove sodium chloride.

EXAMPLE 2

The plasma-exposed semipermeable membrane in Example 1 was tested for permeability to an aqueous phenol solution (concentration 1,000 ppm) under the same experimental conditions as in Example 1. The experiments were carried out at different pH values using sodium hydroxide. As is well known, phenol is not removed in the pH range of 5 to 6 by means of a cellulose acetate membrane.

The results are as follows:

| pH | Water flux (gfd) | Phenol rejection (%) |
| --- | --- | --- |
| 5.4 | 9.4 | 93 |
| 8.3 | 9.3 | 94 |
| 10.1 | 9.3 | 94 |
| 12.3 | 8.7 | 97 |

EXAMPLE 3

The plasma-exposed semipermeable membrane in Example 1 was tested for permeability to an aqueous solution containing aniline, acetone, urea, ethanol or acetic acid (concentration of every solution 1,000 ppm), using the same apparatus as in Example 1. The conditions and results of the experiments were as follows.

| Experimental conditions: | |
| --- | --- |
| Pressure | 50 kg/cm² |
| Solution temperature | 25° C. |
| Feed rate | 270 ml/min |

| | Experimental results: | |
| --- | --- | --- |
| Aqueous solution | Water flux (gfd) | Rejection (%) |
| Aniline | 9.0 | 95 |
| Acetone | 9.6 | 72 |
| Urea | 8.5 | 65 |
| Ethanol | 9.2 | 75 |
| Acetic acid | 9.0 | 82 |

EXAMPLE 4

Sixteen parts of the copolymer obtained in Example 1 were dissolved in a mixed solvent of 74 parts of dimethylformamide and 10 parts of formamide. The resulting solution was cast on a glass plate kept at 40° C. so that the thickness of the solution became 50μ. After 1 minute's evaporation, the glass plate was immersed in water at 16° to 17° C. to carry out gelation of the solution.

After 2 hours, the resulting membrane was removed from the glass plate and was tested, as such, for water permeability under a pressure of 10 kg/cm². The water flux was 108 gfd.

The wet membrane was dried overnight at room temperature. The dry membrane was placed in a vacuum vessel shown in FIG. 1 and a pressure of 0.2 Torr of hydrogen gas was applied in the vessel by controlling cocks 1 and 7. Thereafter, an alternating current voltage of 3.0 kV was applied between electrodes 3 and 4 by means of a neon transformer 2 and the membrane was exposed to the plasma for 10 minutes.

The resulting membrane was mounted on a continuous ultrafiltration apparatus (effective area of membrane 13 cm²) usually used in a laboratory and tested for ultrafiltration performance. The conditions and results of the experiments were as follows.

| Experimental conditions: | |
| --- | --- |
| Pressure | 2 kg/cm² |
| Solution temperature | 25° C. |
| Solute concentration | 1% for every solution |
| Feed rate | 270 ml/min |

| | Experimental results: | | |
| --- | --- | --- | --- |
| Solute | Molecular weight | Water flux (gfd) | Rejection (%) |
| Sodium chloride | 58 | 7.3 | 0 |
| Sucrose | 342 | 3.1 | 15.4 |
| Amaranth | 604 | 5.2 | 30.2 |
| Polyethylene glycol | 2000 | 3.4 | 87.9 |
| Polyethylene glycol | 20000 | 2.9 | 100 |

EXAMPLE 5

Polyacrylonitrile having a logarithmic viscosity number of 2.0 (0.5% dimethylformamide, 250° C.) was prepared by the well-known method. Thereafter, a casting solution comprising 15 parts of the polyacrylonitrile and 85 parts of dimethylformamide was prepared. The resulting solution was cast on a glass plate kept at 40° C. by means of an applicator having a clearance of 250μ. After 1 minute's evaporation, the glass plate was immersed in water at 16° C. to cary out gelation of the solution.

After 2 hours, the resulting membrane was removed from the glass plate and was tested, as such, for water permeability under a pressure of 10 kg/cm². The water flux was 790 gfd.

The wet membrane was dried overnight at room temperature. The dry membrane was placed in a vacuum vessel shown in FIG. 1 and a pressure of 0.2 Torr of oxygen gas was applied in the vessel by controlling cocks 1 and 7. Thereafter, an alternating current voltage of 3.0 kV was applied between electrodes 3 and 4 by means of a neon transformer 2 and the membrane was exposed to the plasma for 30 minutes.

The resulting membrane was tested for ultrafiltration performance using the same apparatus as in Example 4 (membrane area 13 cm², feed rate 270 ml/min) under the same conditions as in Example 4 (2 kg/cm², 25° C., solute concentration 1%).

The results are as follows.

| Solute | Molecular weight | Water flux (gfd) | Rejection (%) |
|---|---|---|---|
| Sucrose | 342 | 6.3 | 5.1 |
| Amaranth | 604 | 7.5 | 7.4 |
| Polyethylene glycol | 2000 | 5.9 | 12.3 |
| Polyethylene glycol | 20000 | 3.5 | 85.0 |
| Pepsin | 35000 | 4.2 | 98.0 |

What is claimed is:

1. A heterogeneous membrane of a thickness of 20 to 500μ comprising acrylonitrile copolymers which has a crosslinked dense layer whose thickness is less than 1μ only in the vicinity of the surface thereof and pores of 100 to 1,000 Å in size in the layer close to said crosslinked dense layer, the size of the pores increasing gradually to 1 to 100μ toward the back surface of the membrane.

2. A heterogeneous membrane according to claim 1 wherein said acrylonitrile copolymers are those comprising acrylonitrile and one or more components selected from the group consisting of acrylamide, diacetone acrylamide, N-vinyl-2-pyrrolidone, hydroxylethyl methacrylate, methyl acrylate, ethyl acrylate, butyl acrylate, methyl methacrylate, ethyl methacrylate, vinyl acetate, ionic monomers such as acrylic acid, ethylene sulfonic acid, methacrylic acid, methallyl sulfonic acid, sulfopropyl methacrylate, vinylbenzene sulfonic acid and metal salts thereof, tertiary amines such as 2-vinylpyridine, 4-vinylpyridine and methylaminoethyl methacrylate, and quaternary amine salts resulting from alkylation of the tertiary amines.

3. A heterogeneous membrane according to claim 1 which is applicable to separation and concentration of substances by reverse osmosis or ultrafiltration.

* * * * *